United States Patent
Jung et al.

(10) Patent No.: US 7,064,311 B2
(45) Date of Patent: Jun. 20, 2006

(54) OPTICAL IMAGE DETECTOR AND METHOD FOR CONTROLLING ILLUMINATION OF THE SAME

(75) Inventors: Duck-Young Jung, Suwon (KR); Bang-Won Lee, Sungnam (KR)

(73) Assignee: Atlab, Inc. (KR)

( * ) Notice: Subject to any disclaimer, the term of this patent is extended or adjusted under 35 U.S.C. 154(b) by 27 days.

(21) Appl. No.: 10/742,478

(22) Filed: Dec. 19, 2003

(65) Prior Publication Data
US 2004/0129861 A1 Jul. 8, 2004

Related U.S. Application Data

(63) Continuation-in-part of application No. 09/888,887, filed on Jun. 25, 2001, now abandoned.

(30) Foreign Application Priority Data
Apr. 2, 2001 (KR) ............... 2001-17349

(51) Int. Cl.
*G01J 1/32* (2006.01)
*H01J 40/14* (2006.01)
(52) U.S. Cl. ............... 250/205; 250/208.1; 250/214 R; 348/296
(58) Field of Classification Search ........... 250/205, 250/208.1, 214 R, 214 LS, 214 SW; 348/296, 348/297, 308, 362, 364, 367; 345/166; 358/475
See application file for complete search history.

(56) References Cited

U.S. PATENT DOCUMENTS

| | | | | |
|---|---|---|---|---|
| 5,514,864 | A | * 5/1996 | Mu-Tung et al. | 250/205 |
| 6,081,612 | A | * 6/2000 | Gutkowicz-Krusin et al. | 382/128 |
| 6,455,840 | B1 | * 9/2002 | Oliver et al. | 250/222.1 |
| 6,674,475 | B1 | * 1/2004 | Anderson | 348/367 |
| 6,870,566 | B1 | * 3/2005 | Koide et al. | 348/296 |

* cited by examiner

*Primary Examiner*—Kevin Pyo
(74) *Attorney, Agent, or Firm*—Cantor Colburn LLP

(57) ABSTRACT

Disclosed is an optical image detector and method for controlling illumination of the same. The optical image detector comprises a light source for controlling the illumination in response to an illumination control signal and irradiating light having the controlled illumination onto a subject, an image sensor for detecting a quantity of light reflected from the subject and generating and outputting image signals corresponding to the detected quantity of light, and an image processor for calculating a shutter-on time using the image signals, comparing the calculated shutter-on time with at least one of maximum and minimum shutter-on times, and generating and outputting the illumination control signal corresponding to values of the compared results. Thereby, the optical image detector solves a noise and an after-image of the optical image generated owing to lack of the quantity of light of the light source, so that it is possible to accurately obtain an image of the subject and to provide a power saving effect.

11 Claims, 8 Drawing Sheets

OPTICAL IMAGE DETECTOR AND METHOD FOR CONTROLLING ILLUMINATION OF THE SAME

CROSS-REFERENCE TO RELATED APPLICATION

This application is a continuation-in-part of application Ser. No. 09/888,887, which is filed Jun. 25, 2001 now abandoned, the disclosure of which is hereby incorporated herein by reference in its entirety.

BACKGROUND OF THE INVENTION

1. Field of the Invention

The present invention relates to an optical image detector and, more particularly, to an optical image detector and method for controlling illumination of the same, in which an optical image reflected from a subject by a light source is detected and the illumination of the light source and an electronic shutter are controlled according to the detected optical image, thereby allowing enhancing a quality of the optical image and optimizing power consumption.

2. Description of the Related Art

Generally, an optical image detector such as an optical mouse is provided with a light source having a predetermined quantity of light, and is an apparatus in which light of the light source is incident onto a subject and an image of the subject is detected through the incident light reflected from the subject.

Particularly, in the case of the optical mouse as an apparatus receiving light reflected from a bottom surface at all times, there is the light source intentionally irradiated at all times. Then, a current consumed by the light source is responsible for most of the power consumption.

This type of optical image detector for receiving the reflected light to detect the image of the subject, as shown in FIG. 1, includes a light source 10, an image sensor 12, an electronic shutter 13, an A/D converter 14, an image processor 15 and a system controller 16.

The light source 10 emits a constant illumination of light, and the image sensor 12 receives light reflected from the subject to output a photo-voltage (or photo-current) corresponding to a quantity of the received light.

The electronic shutter 13 responds to a shutter control signal shutter-ctrl to receive and accumulate the photo-voltage (or photo-current) which is outputted from the image sensor 12 for a shutter-on time, and then extracts optical signals from the accumulated photo-voltage (or photo-current).

The A/D converter 14 converts the optical signals extracted through the electronic shutter 13 into digital signals.

The image processor 15 performs image processing with the use of the digital signals transmitted from the A/D converter 14. Further, the image processor 15 responds to the digital signals to generate the shutter control signal shutter-ctrl for turning the shutter on or off and then transmit the generated shutter control signal shutter-ctrl to the electronic shutter.

The system controller 16 receives image signals outputted from the image processor 15, and drives the system to output the received image signals.

Recently, with a great enhancement of integration in semiconductor devices, the image processor 15 may simultaneously function as the system controller 16.

As for the conventional optical image detector configured and operated in this manner, when the illumination of the light source 10 is sufficient or when a light reflectivity of the subject 11 is high, the reflected light may be incident onto the image sensor 12 in sufficient quantity. Hence, although the electronic shutter is exposed for a short time, a ratio of an optical signal to an optical image noise inputted from the image sensor 12 is high and the optical image can be given in stable quality.

On the contrary, when the illumination of the light source 10 is not sufficient or when the light reflectivity of the subject 11 is low, the reflected light may not be incident onto the image sensor 12 in sufficient quantity. Thus, the shutter-on time of the electronic shutter 13 is to be increased so as for the image sensor 12 to receive the sufficient quantity of the reflected light to obtain an accurate optical image of the subject 11.

FIG. 2 shows an integrated circuit in which the image sensor 12 and the electronic shutter 13 of FIG. 1 are connected.

As shown, the circuit of FIG. 2 is composed of a photo diode PD for generating a photo-current corresponding to a quantity of incident light, a transistor Q1 for amplifying the photo-current generated by the photo diode PD, a capacitor C for generating voltage signals proportional to the photo-current amplified through the transistor Q1, a first switch SW1 for charging electric charges of the capacitor C in response to reset signals, and a second switch SW2 for controlling paths of the transistor Q1 in response to a shutter control signal shutter-ctrl.

An operation of FIG. 2 configured as above is as follows.

First, when reset signals are applied to the first switch SW1 in order to perform an initialization operation, the first switch SW1 is turned off, and driving power is applied to the capacitor C. As a result, the capacitor C charges a quantity of electric charge corresponding to the driving power.

When the initialization operation is completed, the photo diode PD generates the photo-current proportional to the quantity of incident light. The generated photo-current is amplified at a current amplification factor hfe of the transistor Q1.

In this state, when the shutter control signal shutter-ctrl is applied to the second switch SW2, the second switch SW2 is on, and the charged electric charges of the capacitor C are discharged in proportion to the amplified photo-current. Then optical signals proportional to the generated current are generated.

Subsequently, when a shutter-off period becomes and the shutter control signal shutter-ctrl is applied to the second switch SW2, the second switch SW2 is off, and the generated optical signals are buffered through a buffer 20 and outputted.

In this manner, when the total quantity of light incident onto the photo diode PD is not sufficient, the second switch SW2 functioning as the electronic shutter is turned on for a long time, so that an insufficient quantity of light is fully accumulated and converted into the optical signals. At this time, the optical signals include a intrinsic level of noise generated by noise sources of the photo diode PD and the transistor Q1.

As a result, when the quantity of light incident onto the image sensor is little, a difference between values of the noise and the illumination of the optical signals is decreased as shown in FIG. 3A.

Thus, when the shutter-on time is increased in order to compensate the illumination values of the optical signals, the illumination values of the optical signals are increased together with the noise level as shown in FIG. 3B.

When the optical signals of FIG. 3B, which has a relation between the values of the noise and the illumination, is shown in the state of the image, there is generated a problem in that the noise is mixed into the image as shown in FIG. 4A.

Further, when the shutter-on time of the electronic shutter is increased, an after-image effect generated when the shutter-on time is increased in a general film camera is obtained. When the image of the subject in motion is detected, there is another problem in that the after-image effect becomes more and more serious as shown in FIG. 4B.

SUMMARY OF THE INVENTION

It is, therefore, an object of the present invention to provide an optical image detector and method for controlling illumination of the same, capable of actively controlling illumination of a light source to minimize a noise and an after-image of an optical image generated owing to lack of the illumination.

It is another object of the present invention to provide an optical image detector and method for controlling illumination of the same, capable of directly controlling illumination of a light source according to optical signals reflected from a subject, thereby preventing unnecessary power consumption of the light source to provide a power saving effect.

In order to accomplish these objects, according to a first aspect of the present invention, there is provided an optical image detector comprising: a light source for controlling illumination in response to an illumination control signal and irradiating light having the controlled illumination onto a subject; an image sensor for detecting a quantity of light reflected from the subject and generating and outputting image signals corresponding to the detected quantity of light; and an image processor for calculating a shutter-on time using the image signals, comparing the calculated shutter-on time with at least one of maximum and minimum shutter-on times, and generating and outputting the illumination control signal corresponding to values of the compared results.

In order to accomplish these objects, according to a second aspect of the present invention, there is provided an optical image detector comprising: a light source for controlling illumination in response to an illumination control signal and irradiating light having the controlled illumination onto a subject; an image sensor for generating and outputting an photo-current proportional to a quantity of light reflected from the subject; an electronic shutter for accumulating the photo-current transmitted from the image sensor in response to a shutter control signal when a shutter-on time arrives and generating and outputting image signals corresponding to the accumulated photo-current; and an image processor for calculating an average value of the image signals, comparing the calculated average value of the image signals with at least one of maximum and minimum values of the calculated average value, and generating and outputting the illumination control signal and the shutter control signal which take values of the compared results into consideration.

In order to accomplish these objects, according to a first aspect of the present invention, there is provided a method for controlling illumination at an optical image detector, the method comprising the steps of: calculating a shutter-on time using image signals and comparing the calculated shutter-on time with at least one of preset maximum and minimum shutter-on times; maintaining a present illumination of a light source when the calculated shutter-on time is less than the maximum shutter-on time and greater than the minimum shutter-on time; increasing the present illumination of the light source when the calculated shutter-on time is greater than the maximum shutter-on time; and decreasing the present illumination of the light source when the calculated shutter-on time is less than the minimum shutter-on time.

In order to accomplish these objects, according to a second aspect of the present invention, there is provided a method for controlling illumination at an optical image detector, the method comprising the steps of: calculating an average value of image signals and comparing the calculated average value of the image signals with at least one of preset maximum and minimum values of the average value of the image signals; maintaining former illumination and shutter on time when the calculated average value of the image signals is less than the maximum value and greater than the minimum value; decreasing the former illumination and shutter on time when the calculated average value of the image signals is greater than the maximum value; and increasing the former illumination and shutter on time when the calculated average value of the image signals is less than the minimum value.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Figure 1:
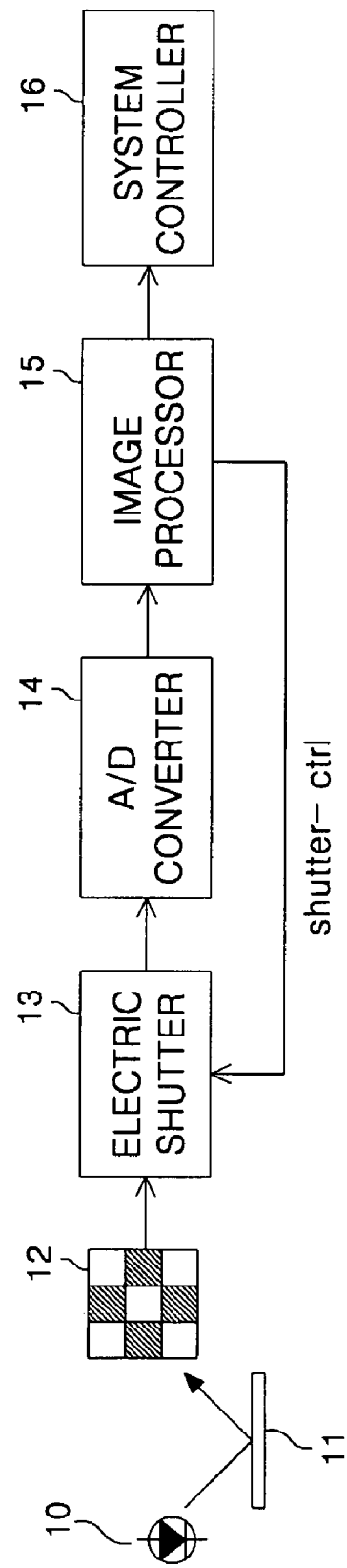
FIG. 1 is a block diagram showing an optical image detector according to the prior art.
Figure 2:
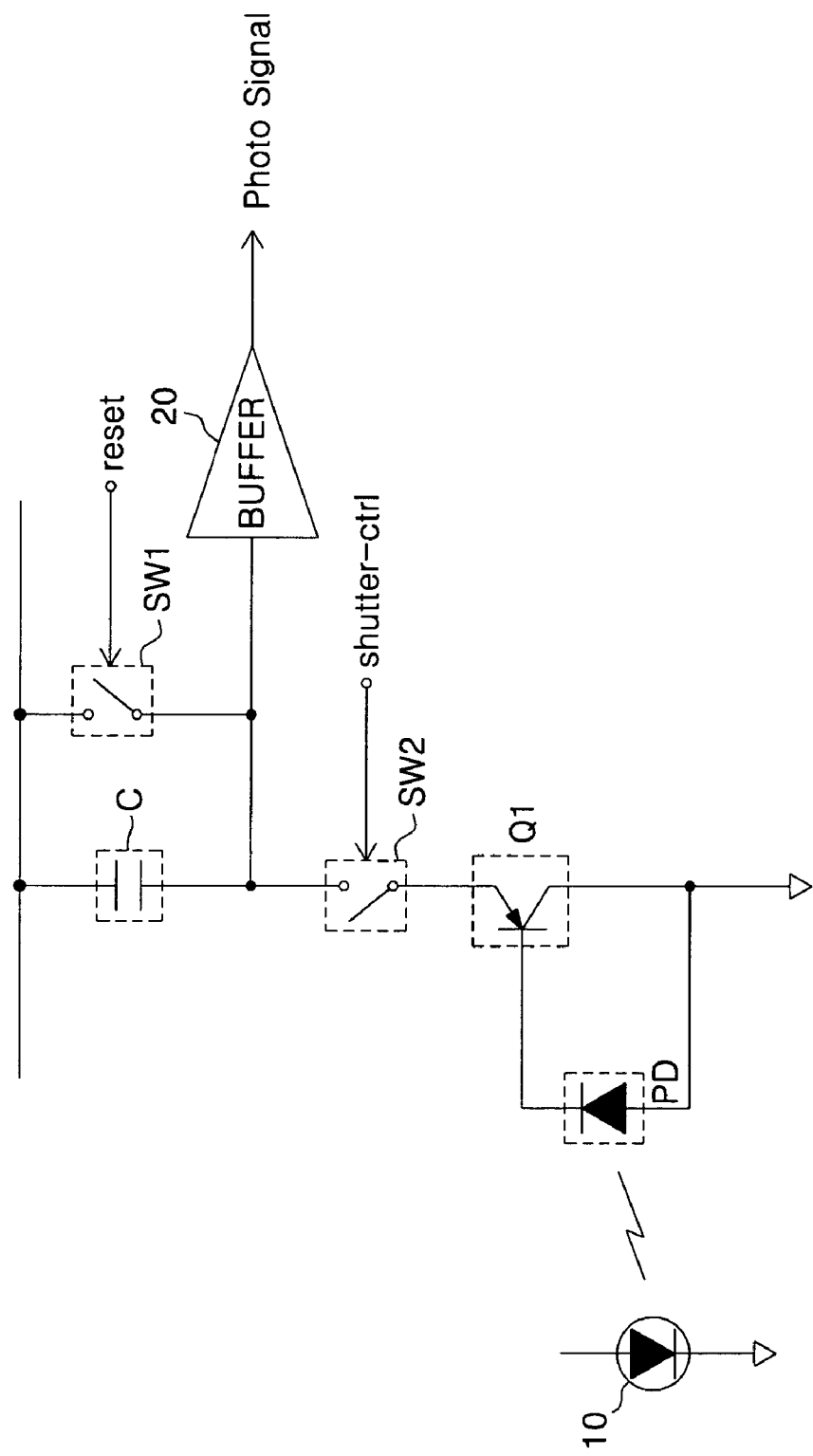
FIG. 2 is a detailed circuit diagram showing an image sensor and an electronic shutter of the conventional optical image detector.
Figure 3A:
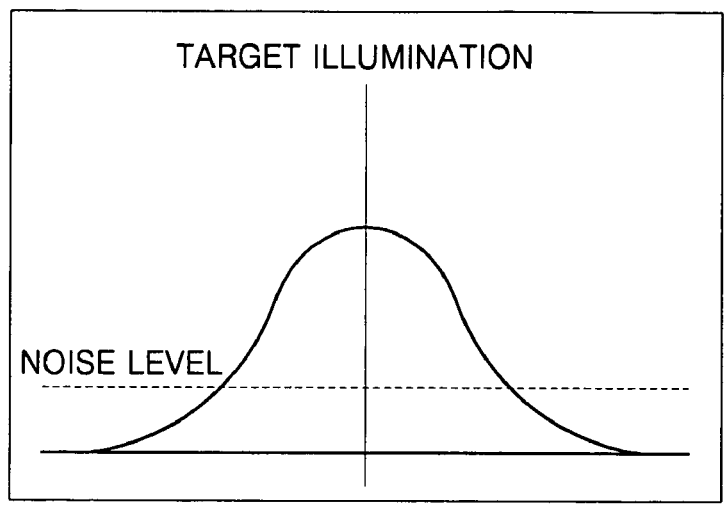
FIGS. 3a and 3b are optical waveform diagrams of the conventional optical image detector, respectively.
Figure 3B:
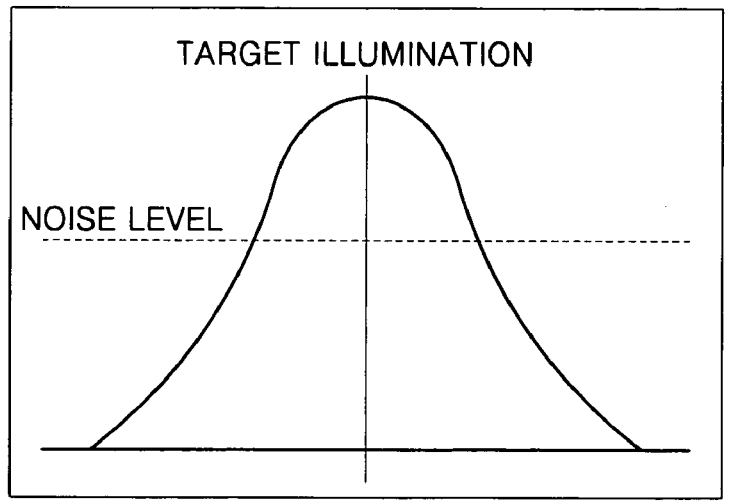
Figure 4A:
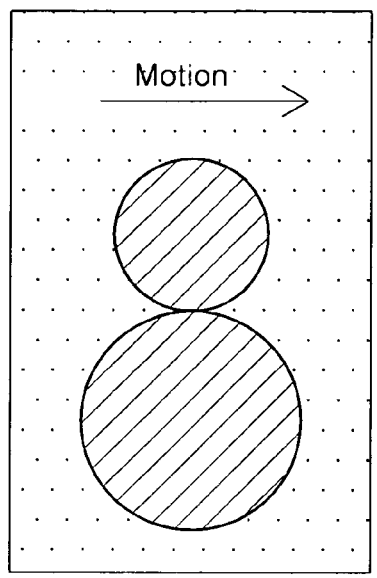
FIGS. 4a and 4b are image diagrams of the conventional optical image detector.
Figure 4B:
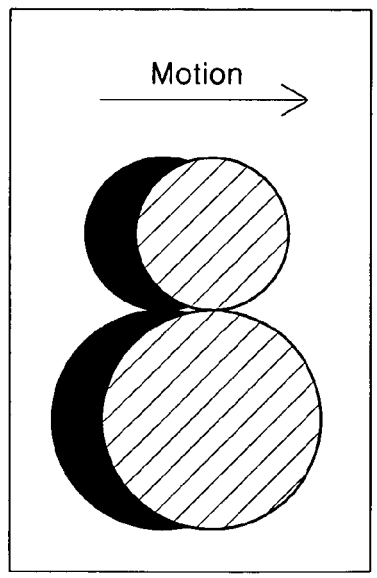
Figure 5:
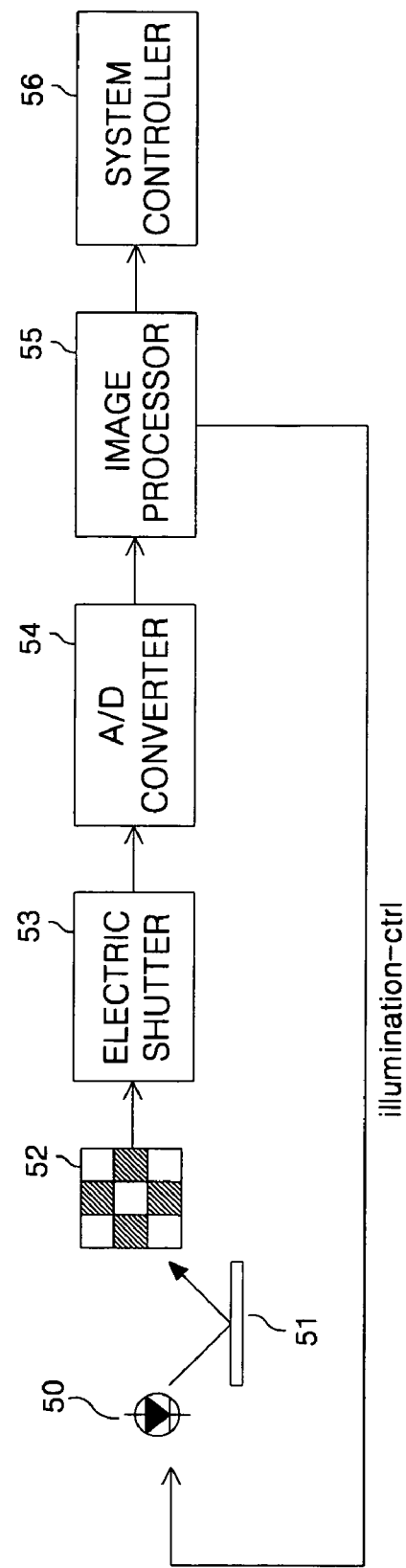
FIG. 5 is a block diagram showing an optical image detector according to a first embodiment of the present invention.

FIG. 5 shows a configuration of an optical image detector according to a first embodiment of the present invention.

Referring to FIG. 5, the optical image detector of the present invention includes a light source 50, an image sensor 52, an electronic shutter 53, an A/D converter 54, an image processor 55 and a system controller 56.

The light source 50 responds to an illumination control signal illumination-ctrl to control illumination, and then irradiates light having the controlled illumination.

The image sensor 52 receives light reflected from a subject 51, and generates and outputs a photo-voltage (or photo-current) corresponding to a quantity of the received light.

The electronic shutter 53 receives and accumulates the photo-voltage (or photo-current) outputted from the image sensor 52 for a fixed shutter-on period, and extracts and outputs optical signals from the accumulated photo-voltage (or photo-current).

The A/D converter 54 converts the optical signals extracted through the electronic shutter 53 into digital signals and outputs the converted results.

The image processor 55 receives the digital signals converted through the A/D converter 54 and performs image processing with the use of the received digital signals.

Here, the image processor 55 sets up a maximum shutter-on time Tmax and a minimum shutter-on time Tmin which the electronic shutter 53 can provide, and stores them.

Then, the image processor 55 calculates the shutter-on time which the present optical image detector requires using the received digital signals, compares the calculated shutter-on time and the pre-stored shutter-on time of the electronic shutter 53, and generates the illumination control signal corresponding to the compared result.

The illumination control signal illumination-ctrl may be either a pulse amplitude modulation PAM signal as a pulse signal modulating the amplitude of a pulse according to the compared result.

Further, the illumination control signal illumination-ctrl may be a pulse width modulation PWM or pulse duration modulation PDM signal as a pulse signal modulating a width of a pulse, or an analog voltage or current changed according to the compared result.

The system controller 56 receives image signals outputted from the image processor 55, and drives the system to output the received image signals.

The optical image detector of FIG. 5 has been described that the image processor 55 controls the illumination of the light source 50 but the system controller 56 may control the illumination if necessary.

Figure 6:
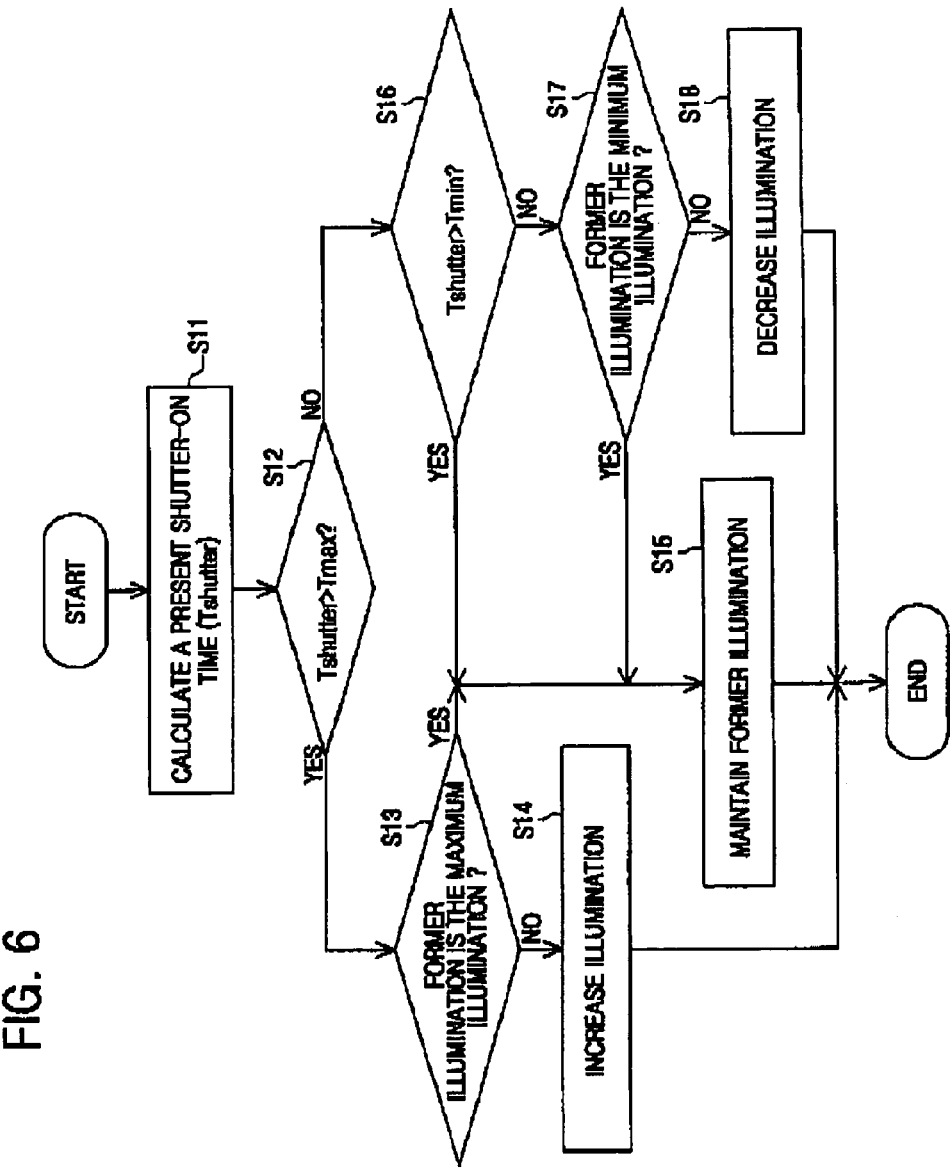
FIG. 6 is a flow chart for explaining a method for controlling illumination at the optical image detector of FIG. 5.

FIG. 6 is a flow chart for explaining a method for controlling illumination at the image processor of FIG. 5.

A shutter-on time that a present optical image detector requires in response to received digital signals is calculated (S11).

The present shutter-on time Tshutter of the electronic shutter 53 calculated at present is compared with a former maximum shutter-on time Tmax set up and stored previously (S12).

As the compared result, if the present shutter-on time Tshutter of the electronic shutter 53 is greater than the former maximum shutter-on time Tmax, it is checked whether or not a former illumination of the light source 50 is the maximum value (S13). As the checked result, if the former illumination of the light source 50 is not the maximum value, an illumination control signal illumination-ctrl for enhancing the illumination of the light source 50 is generated and outputted (S14).

The illumination control signal illumination-ctrl increases or decreases the illumination of the light source 50 step by step.

However, if it is checked that the former illumination of the light source 50 has already provided the maximum illumination through the step S13, it is determined that the illumination of the light source 50 does no longer need to be enhanced. Thus, an illumination control signal illumination-ctrl for maintaining the former illumination is outputted and outputted (S15).

As the compared result in the step S12, if the present shutter-on time Tshutter of the electronic shutter 53 is less than the former maximum shutter-on time Tmax, the present shutter-on time Tshutter of the electronic shutter 53 is compared again with the minimum shutter-on time Tmin (S16).

As the compared result in the step S16, if the present shutter-on time Tshutter of the electronic shutter 53 is greater than the minimum shutter-on time Tmin, the illumination control signal illumination-ctrl for maintaining the former illumination is outputted and outputted (S15). However, if not so, it is checked whether the former illumination of the light source 50 is the minimum value (S17).

As the checked result in the step S17, if the former illumination of the light source 50 has already provided the minimum level of illumination, it is determined that the illumination of the light source 50 does no longer need to be lowered. Thus, the illumination control signal illumination-ctrl for maintaining the former illumination is outputted and outputted (S15). However, if not so, an illumination control signal illumination-ctrl for lowering the illumination of the light source 50 is outputted and outputted (S18).

The method of FIG. 6 for controlling the illumination has been described to receive one frame, to calculate the desired shutter-on time and to generate the illumination control signal illumination-ctrl corresponding to the calculated shutter-on time. However, if necessary, the method of FIG. 6 may calculate the desired shutter-on time with the use of a plurality of frames received for a predetermined time to generate the illumination control signal illumination-ctrl corresponding to the calculated shutter-on time.

As seen from the above, the optical image detector of FIG. 5 is designed to allow the image sensor to receive the sufficient quantity of light at all times by directly controlling the illumination of the light source.

Therefore, it is unnecessary to increase the shutter-on time in order for image sensor to receive the sufficient quantity of light like the conventional optical image detector. Further, it is possible to prevent both the increase of the noise level and the after-image effect in advance, both of which are caused by the increase of the shutter-on time.

Figure 7:
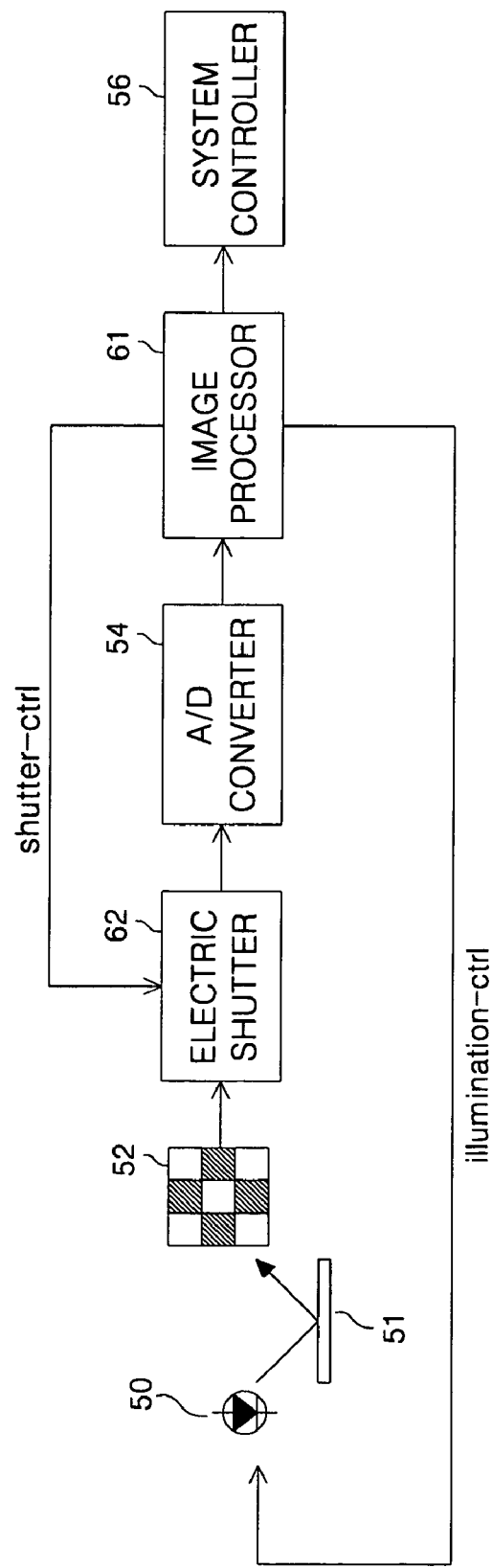
FIG. 7 is a block diagram showing an optical image detector according to a second embodiment of the present invention.

FIG. 7 shows a configuration of an optical image detector according to a second embodiment of the present invention.

The optical image detector of FIG. 7 is configured to allow the image processor 55 of FIG. 5 to control the illumination of the light source 50 as well as the shutter-on/off time of the electronic shutter 53.

In the circuit of FIG. 7, components performing the same operation as those of FIG. 5 will be given the same reference numerals, and so their detailed description will be omitted.

Subsequently, referring to FIG. 7, an image processor 61 receives digital signals converted through the A/D converter 54 and performs image processing with the use of the received digital signals.

Further, the image processor 61 sets up and stores maximum and minimum average values Pmax and Pmin of the digital signals Pij of the image sensor 52 which the optical image detector requires to obtain an accurate image of a subject.

Then, the image processor 61 calculates an average value Avg(Pij) of the digital signals Pij which is required to obtain one frame, compares the calculated average value Avg(Pij) of the digital signals Pij and the pre-stored maximum and minmum average values Pmax and Pmin of the digital signals Pij, and generates an illumination control signal illumination-ctrl and a shutter control signal shutter-ctrl which take the compared result into consideration.

An electronic shutter 62 responds to the shutter control signal shutter-ctrl transmitted from the image processor 61 to receive and accumulate a photo-voltage (or, photo-current) outputted from the image sensor 52 when a shutter-on period arrives, and extracts and outputs optical signals from the accumulated photo-voltage (or, photo-current) when a shutter-off period arrives.

Figure 8:
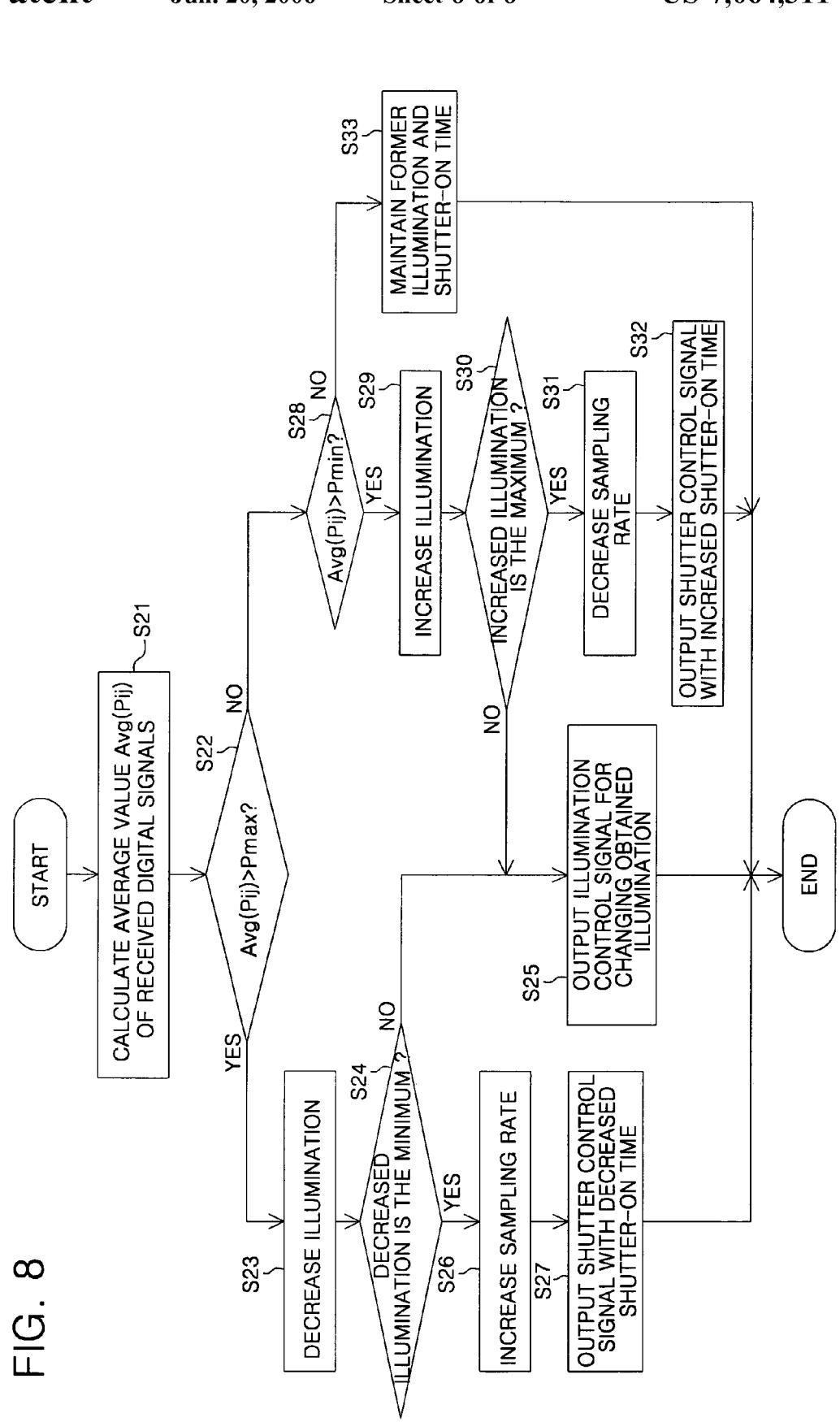
FIG. 8 is a flow chart for explaining a method for controlling illumination at the optical image detector of FIG. 7.

FIG. 8 is flow chart for explaining a method for controlling illumination and shutter at the image processor of FIG. 7.

An average value Avg(Pij) of digital signals Pij outputted from the image sensor 52 having an i×j pixel matrix is calculated (S21).

The calculated average value Avg(Pij) of the digital signals Pij is compared with the maximum average value Pmax of the digital signals Pij set up and stored previously (S22).

As the compared result, if the average value Avg(Pij) of the digital signals Pij is greater than the maximum average value Pmax of the digital signals Pij, a former illumination of the light source 50 is decreased by one level (S23).

It is checked whether or not the decreased illumination of the light source 50 is the minimum value (S24). As the checked result, if the illumination of the light source 50 is not the minimum value, a changing illumination control signal illumination-ctrl for changing a present illumination of the light source 50 into the illumination obtained through the step S23 is generated and outputted (S25).

However, if it is checked that the present illumination of the light source 50 has been already provided with the minimum value through the step S24, it is determined that the illumination of the light source 50 can be no longer decreased, and thus a sampling rate is increased (S26).

The shutter-on time is decreased in response to the sampling rate increased through the step S26, the shutter control signal shutter-ctrl with the decreased shutter-on time is generated and outputted (S27).

As the compared result in the step S22, if the calculated average value Avg(Pij) of the digital signals Pij is less than the maximum average value Pmax, the calculated average value Avg(Pij) of the digital signals Pij is compared again with the minimum average value Pmin (S28).

As the compared result in the step S28, when it is determined that the calculated average value Avg(Pij) of the digital signals Pij is less than the minimum average value Pmin, the former illumination of the light source 50 is increased by one level (S29).

It is checked whether the increased illumination of the light source 50 is the maximum value that the light source 50 provides (S30). As the checked result, if the present illumination of the light source 50 is not the maximum value, an illumination control signal illumination-ctrl for changing the present illumination of the light source 50 into the illumination obtained through the step S29 is generated and outputted (S25).

However, if the present illumination of the light source 50 is the maximum value, it is determined that the illumination of the light source 50 can be no longer increased, and thus the sampling rate is decreased (S31).

The shutter-on time is increased in response to the sampling rate decreased through the step S31, and the shutter control signal shutter-ctrl with the increased shutter-on time is generated and outputted (S32).

As the compared result in the step S28, if it is determined that the calculated average value Avg(Pij) of the digital signals Pij is greater than the minimum average value Pmin and less than the maximum average value Pmax, the illumination control signal illumination-ctrl and the shutter control signal shutter-ctrl for maintaining the former illumination of the light source 50 and the shutter-on time are each generated and outputted (S33).

The method of FIG. 8 for controlling the illumination has been described to generate the illumination control signal illumination-ctrl for controlling the illumination of the light source using the result determined once. However, if necessary, the method of FIG. 8 may generate the illumination control signal illumination-ctrl for controlling the illumination of the light source by accumulating the results determined several times Further, the method of FIG. 8 for controlling the illumination has been described to receive one frame, to calculate the average value of the digital signals and to generate the illumination control signal illumination-ctrl and the shutter control signal shutter-ctrl that correspond to the calculated average value of the digital signals. However, if necessary, the method of FIG. 8 may calculate the average value of the digital signals with the use of the plurality of frames received for a predetermined time and to generate the illumination control signal illumination-ctrl corresponding to the calculated average value of the digital signals.

As seen from the above, the optical image detector of FIG. 8 is designed to control the illumination of the light source and to control the shutter-on time of the electronic shutter when the illumination of the light source is no longer controlled.

Therefore, the optical image detector of FIG. 8 is capable of removing the noise and the after-image of the image by controlling the illumination and the exposure time of the light source, and of controlling intentional distortion of the image and a special effect such as the after-image.

Although a preferred embodiment of the present invention has been described for illustrative purposes, it is apparent to those skilled in the art that various modifications, additions and substitutions are possible, without departing from the scope and spirit of the invention as disclosed in the accompanying claims.

As can seen from the above, the present invention causes illumination of a light source to be directly controlled to solve a noise and an after-image of an optical image generated owing to lack of a quantity of light of the light source, so that an image of a subject can be accurately obtained.

Further, the illumination of the light source and the electronic shutter are directly controlled, so that it is possible to expect a power saving effect capable of reducing unnecessary power consumption of the light source.

What is claimed is:

1. An optical image detector comprising:
   a light source for controlling illumination in response to an illumination control signal and irradiating light having the controlled illumination onto a subject;
   an image sensor for detecting a quantity of light reflected from the subject and generating and outputting image signals corresponding to the detected quantity of light; and an image processor for calculating a shutter-on time using the image signals, comparing the calculated shutter-on time with at least one of maximum and minimum shutter-on times, and generating and outputting the illumination control signal for maintaining a former illumination of the light source when the calculated shutter-on time is less than the maximum shutter-on time and greater than the minimum shutter-on time, increasing the former illumination of the light source when the calculated shutter-on time is greater than the maximum shutter-on time and decreasing the former illumination of the light source when the calculated shutter-on time is less than the minimum shutter-on time.

2. The optical image detector as claimed in claim 1, wherein the image sensor comprises an electronic shutter having a fixed shutter-on/off period.

3. The optical image detector as claimed in claim 1, wherein the illumination control signal is a pulse signal whose amplitude is modulated according to the compared results.

4. The optical image detector as claimed in claim 1, wherein the illumination control signal is a pulse signal whose width is modulated according to the compared results.

5. The optical image detector as claimed in claim 1, wherein the illumination control signal causes the illumination of the light source to experience any one of increase and decrease step by step.

6. An optical image detector comprising:
   a light source for controlling illumination in response to an illumination control signal and irradiating light having the controlled illumination onto a subject;
   an image sensor for generating and outputting an photo-current proportional to a quantity of light reflected from the subject;
   an electronic shutter for accumulating the photo-current transmitted from the image sensor in response to a shutter control signal when a shutter-on time arrives and generating and outputting image signals corresponding to the accumulated photo-current; and
   an image processor for calculating an average value of the image signals, comparing the calculated average value of the image signals with at least one of maximum and minimum values of the average value, and generating and outputting the illumination control signal and the shutter control signal for maintaining former illumination and shutter-on time when the calculated average value of the image signals is less than the maximum value of the average values and greater than the minimum value of the average values, decreasing the former illumination and shutter-on time when the calculated average value of the image signals is greater than the maximum value of the average value, and increasing the former illumination and shutter-on time when the calculated average value of the image signals is less than the minimum value of the average value;
   wherein the illumination control signal is a pulse signal whose width is modulated according to the compared results.

7. The optical image detector as claimed in claim 6, wherein the illumination control signal causes the illumination of the light source to experience any one of increase and decrease step by step.

8. A method for controlling illumination at an optical image detector, the method comprising the steps of:
   calculating a shutter-on time using image signals and comparing the calculated shutter-on time with at least one of preset maximum and minimum shutter-on times;
   maintaining a present illumination of a light source when the calculated shutter-on time is less than the maximum shutter-on time and greater than the minimum shutter-on time;
   increasing the present illumination of the light source when the calculated shutter-on time is greater than the maximum shutter-on time; and
   decreasing the present illumination of the light source when the calculated shutter-on time is less than the minimum shutter-on time.

9. A method for controlling illumination at an optical image detector, the method comprising the steps of:
   calculating an average value of image signals and comparing the calculated average value of image signals with at least one of preset maximum and minimum values of the average value of the image signals;
   maintaining former illumination and shutter on time when the calculated average value of the image signals is less than the maximum value and greater than the minimum value;
   decreasing the former illumination and shutter on time when the calculated average value of the image signals is greater than the maximum value; and
   increasing the former illumination and shutter on time when the calculated average value of the image signals is less than the minimum value.

10. The method as claimed in claim 9, wherein the step of decreasing the shutter-on time comprises the sub-steps of:
    decreasing the former illumination when the calculated average value of the image signals is greater than the maximum value; and
    decreasing the shutter on time when the decreased illumination is a minimum value which the light source provides.

11. The method as claimed in claim 9, wherein the step of increasing the shutter-on time comprises the sub-steps of:
    increasing the former illumination when the calculated average value of the image signals is less than the minimum value; and
    decreasing the shutter on time when the increased illumination is a maximum value which the light source provides.

* * * * *